United States Patent
Cheng

Patent Number: 6,014,256
Date of Patent: Jan. 11, 2000

[54] POLARIZING BEAM SPLITTER/COMBINER

[76] Inventor: Yihao Cheng, 36 Meadowbreeze Drive, Kanata, Ontario, Canada, K2M 2L6

[21] Appl. No.: 09/045,946

[22] Filed: Mar. 23, 1998

Related U.S. Application Data

[63] Continuation-in-part of application No. 08/942,496, Oct. 2, 1997, which is a continuation-in-part of application No. 08/896,540, Jul. 18, 1997, Pat. No. 5,850,493.

[51] Int. Cl.[7] ............................................. G02B 5/30
[52] U.S. Cl. ........................... 359/495; 359/494; 359/497; 385/11
[58] Field of Search ...................................... 359/494, 495, 359/496, 497; 385/11, 27, 134; 372/703

[56] References Cited

U.S. PATENT DOCUMENTS

| | | | |
|---|---|---|---|
| 5,033,830 | 7/1991 | Jameson | 359/494 |
| 5,428,477 | 6/1995 | Siroki | 372/703 |
| 5,446,578 | 8/1995 | Chang et al. | 372/703 |
| 5,499,132 | 3/1996 | Tojo et al. | 359/495 |
| 5,499,307 | 3/1996 | Iwatsuka | 359/494 |
| 5,574,595 | 11/1996 | Kurata et al. | 372/703 |
| 5,740,288 | 4/1998 | Pan | 385/11 |
| 5,848,203 | 12/1998 | Kawakami et al. | 385/11 |

FOREIGN PATENT DOCUMENTS

| | | | |
|---|---|---|---|
| 41487 | 3/1980 | Japan | 385/11 |

*Primary Examiner*—Cassandra Spyrou
*Assistant Examiner*—John Juba, Jr.
*Attorney, Agent, or Firm*—Neil Teitelbaum & Associates

[57] ABSTRACT

A polarization beam splitter combiner uses a birefringent crystal that is a fraction of the size of conventional crystals used in similar devices. Since the crystal is considerably shorter in length, the beam passing through the crystal can be uncollimated, spreading very little from one end to the other. Launching uncollimated beams through a short small crystal obviates the requirement for lenses at the end face of the crystal having two waveguides coupled thereto. Since lenses are not required the waveguides at the input/output end face can be very closely spaced apart. Conventional lensed devices utilizing a pair of lenses at an input/output end face must be considerably larger in order to accommodate the lenses and resulting collimated beams.

5 Claims, 4 Drawing Sheets

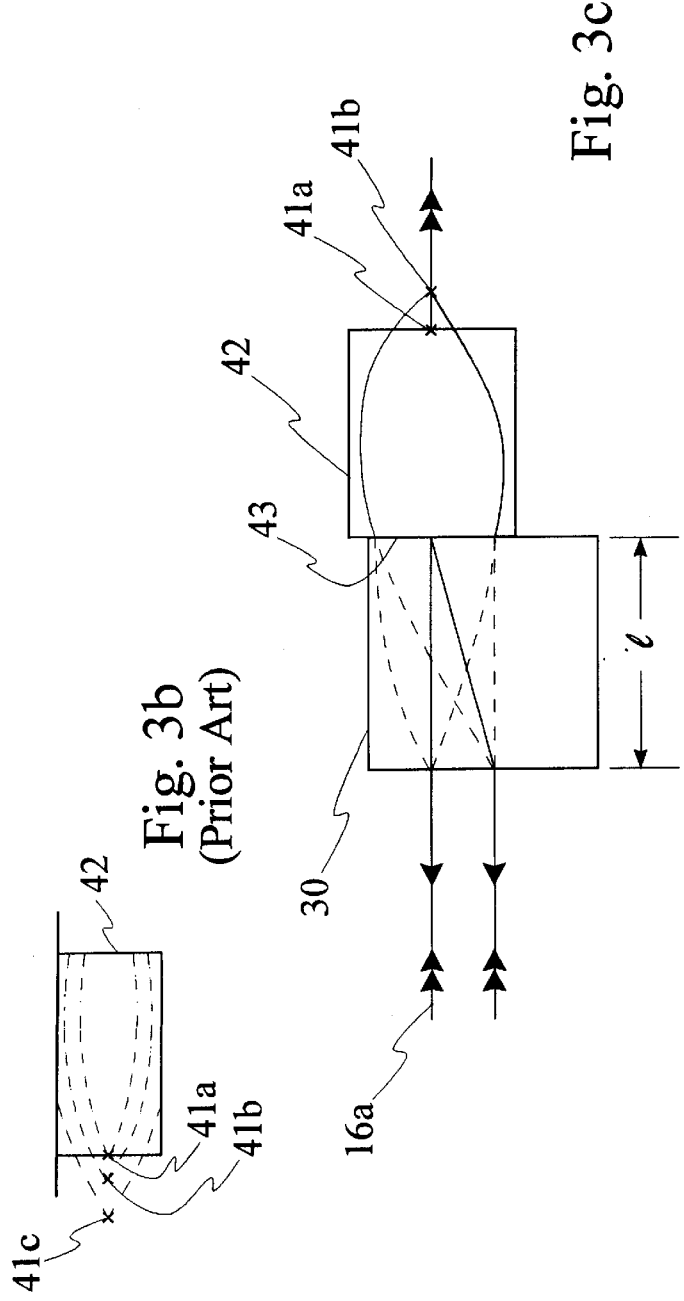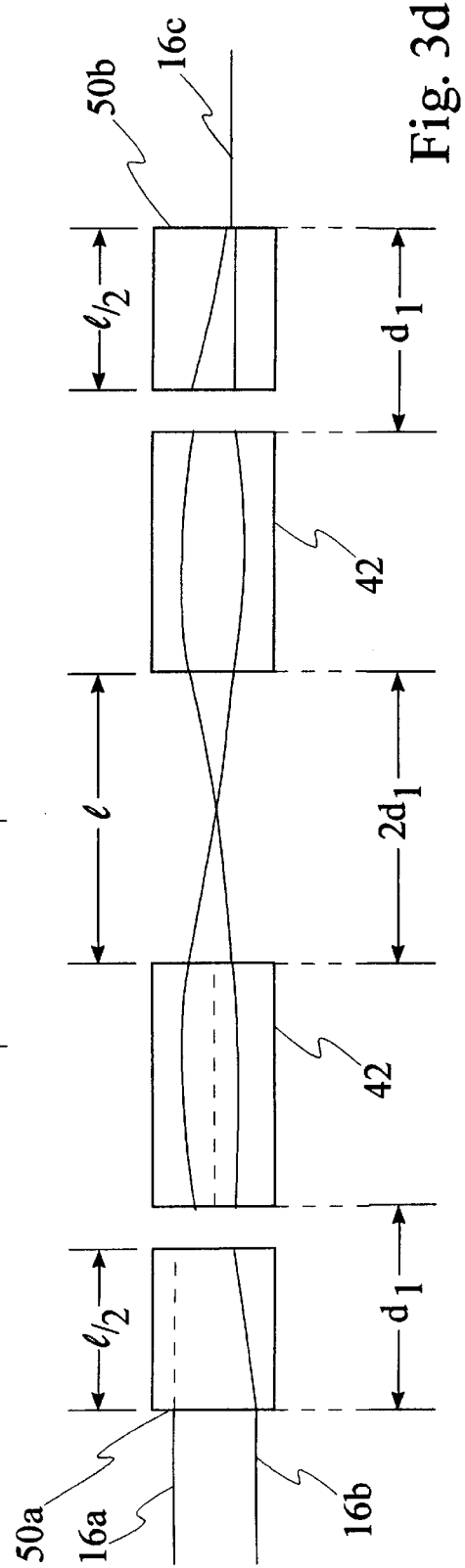

6,014,256

POLARIZING BEAM SPLITTER/COMBINER

This application is a continuation-in-part of U.S. patent application Ser. No. 08/942,496 filed Oct. 2, 1997 entitled Optical Circulator which is a continuation-in-part of U.S. Pat. No. 5,850,493 issued from U.S. patent application Ser. No. 8/896,540, filed Jul. 18, 1997, now U.S. Pat. No. 5,850,493, entitled DEVICE FOR FOCUSING LIGHT THROUGH AN OPTICAL COMPONENT.

FIELD OF THE INVENTION

This invention relates to a polarizing beam splitter for splitting an incoming beam into two orthogonal polarized beams or for combining two orthogonal polarized beams into a single beam.

BACKGROUND OF THE INVENTION

Many polarizers and polarizing beam-splitters are known to the art, each having disadvantages.

The Glan-Thompson polarizer, which is a block of birefringent material cut into prisms and then cemented together acts by reflecting one polarization component at the cement interface and by transmitting the other. The device requires a considerable amount of birefringent material, generally calcite, which is scarce and expensive, and is unable to work with high powered lasers and ultraviolet light, since the light destroys or clouds cement. Furthermore, this beam-splitter, which makes use of the reflected polarization component, suffers from the added disadvantage that polarized beams exit the device at inconvenient angles, for example 45 degrees, when it is often useful that beams are parallel, orthogonal or otherwise oriented.

The Glan-Taylor polarizer which is similar to the Glan-Thompson polarizer but uses an air space instead of cement to separate polarization components can work with many light sources but suffers from reflection loss and ghosting caused by the air gap.

The Wollaston, Rochon and Senarmont beam-splitters, which separates polarization components by transmitting the components through an interface, permit optical contacting for use with most light sources, but produce beams which also exit at inconvenient angles, with one or both polarization components suffering from chromatism and distortion.

The double refracting element (beam displacer), which produces parallel polarized beams of light, achieves small beam separation and limited field. Also, since the beams may pass through a considerable amount of material before achieving useful separation, wavefront distortion can occur in the extraordinary beam due to imperfections in the crystal's structure. (See for example, "Birefringence of Quartz and Calcite," Journal of the Optical Society of America, volume 49, No. 7, July 1959, pages 710–712.) Beam separation can be further limited by the small size and high cost of suitable crystals. Notwithstanding, it is an object of the invention to overcome some of these limitations while using a beam displacing crystal.

Polarizing prisms and their various defects are described in detail by Bennett and Bennett, "Polarization," Handbook of Optics, Driscoll and Vaughan, eds., McGraw-Hill, 1978.

It is an object of this invention, to provide a polarization beam splitter that obviates most of the above mentioned disadvantages of prior art devices; it is yet a further object to provide a device having as its core element a birefringent crystal that is considerably less costly to manufacture than commercially available birefringent crystal based devices. It is yet a further object of the invention to provide a polarization beam splitter that requires a much smaller crystal than conventional commercially available devices that utilized a same type of beam shifting crystal.

SUMMARY OF THE INVENTION

In accordance with the invention, there is provided, a polarization beam splitter and/or combiner comprising a first optical fibre;

two closely spaced optical fibres disposed a predetermined distance from the first optical fibre and optically coupled therewith;

a birefringent crystal disposed between the first optical fibre and the two closely spaced optical fibres for splitting an uncollimated input beam into a first beam of a first polarization and a second beam of a second orthogonal polarization; and lens means disposed between or on at least one of the optical fibres and the birefringent crystal for directing uncollimated light through the birefringent crystal and for focusing light at an end face of the optical fibre.

In accordance with another aspect of the invention, there is provided, a polarization beam splitter comprising:

two lenses, each lens having an at least substantially collimating end face and a substantially focusing end face;

a birefringent crystal coupled with each of the two lenses for separating or combining orthogonal polarized beams of light;

a waveguide adjacent at least one of the two lenses for launching light to or from a respective adjacent lens, the waveguides each having an end that is separated from its adjacent lens by an optical distance of approximately $d_1$, an optical distance between the two substantially collimating end faces of the at least two lenses being d2, where $d_1$ is approximately equal to one half of $d_2$, and wherein $d_1 > 0$.

It is well known that the most costly component in most beam splitter combiners that utilize a birefringent crystal, is the double refracting crystal element itself.

Advantageously, this invention provides a structure that requires a substantially smaller (approximately $\frac{1}{50}^{th}$ the size of) birefringent crystal than is required in most commercially available devices of a similar design utilizing birefringent beam shifting crystals.

BRIEF DESCRIPTION OF THE DRAWINGS

Exemplary embodiments of the invention will now be described in conjunction with the drawings, in which:

FIG. 3b is a side view of a prior art, substantially quarter-pitch GRIN lens;

FIG. 3c is a top view of a polarization beam splitter as is shown in FIG. 3a having a single GRIN lens;

FIG. 3d is a top view of an alternative embodiment of a polarization beam splitter in accordance with the invention wherein two crystals and two lenses are used to minimize a beam diameter propagating through the lenses and to enhance the coupling of light between ports;

DETAILED DESCRIPTION

Figure 1:
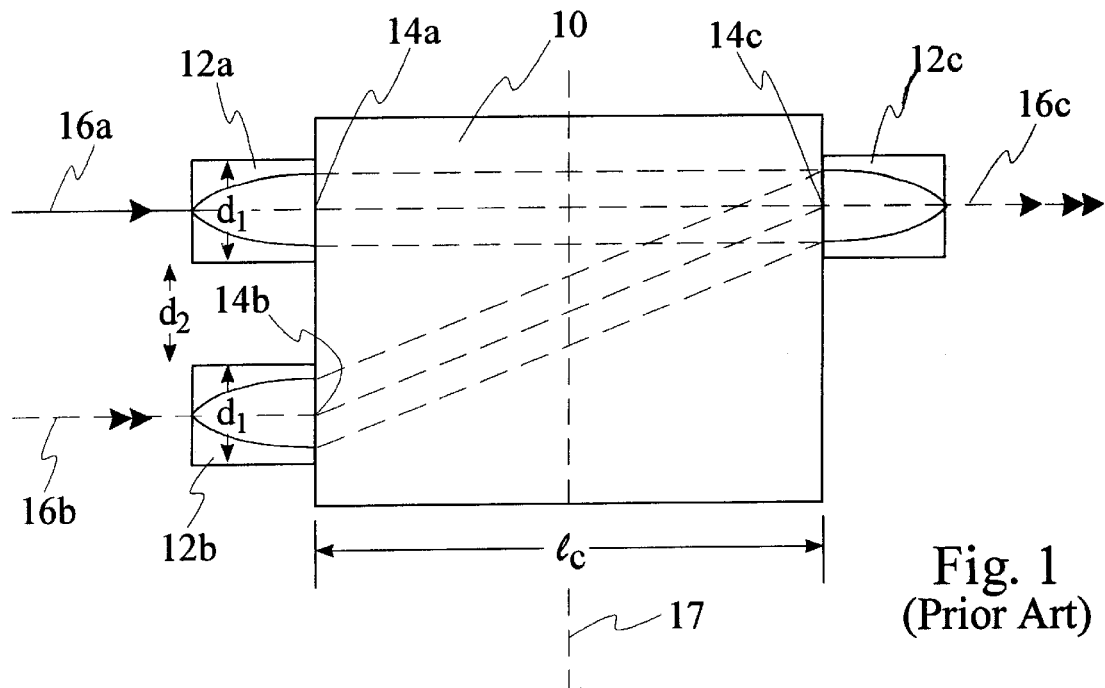
FIG. 1 is a top view of a prior art polarization beam splitter.
Figure 2:
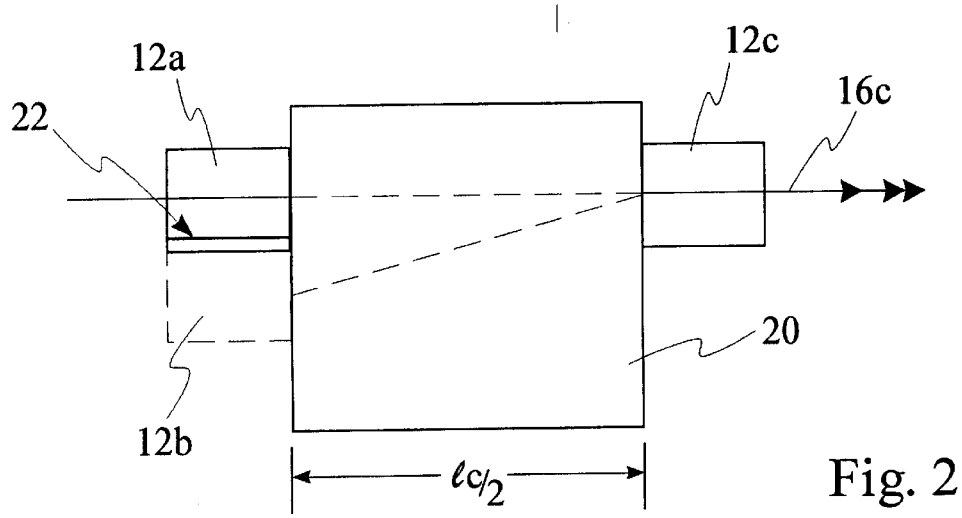
FIG. 2 is a top view of polarization beam splitter that is not functional due to its short crystal length.

FIG. 1 depicts a well known polarization beam splitter/coupler design, wherein a birefringent crystal 10 such as a calcite crystal is disposed adjacent three quarter pitch focusing/collimating graded index lenses, 12a and 12b at a first end face and 12c at an opposite end face of the crystal disposed to receive light from the other two lenses. It is noted in FIG. 1, that the beam widths 14a, 14b at an end face of one of the lenses denoted by a heavy black line at the lens-crystal interface, defines length that is less than the minimum size of the crystal end face, which must be sized to accommodate the beams including some additional adjustment space denoted by the length $d_2$. Stated differently, since the GRIN lenses 12a and 12b each have a diameter of $d_1$, and there is some adjustment/tuning space $d_2$ between the lenses 12a and 12b, the crystal must have a width sufficient to accommodate the sum of the lengths $S=d_1+d_1+d_2$. Furthermore, as the length S increases due to particular design requirements for $d_1$ or $d_2$ to increase, the overall length of the crystal $l_c$ must also increase. Conversely if the crystal is to be shortened, for example half as long as it is in FIG. 1, the available space to place the lenses 12a and 12b becomes less. This is illustrated in FIG. 2 in a non-working embodiment, wherein the crystal length is $l_c/2$ and sufficient space to place the lenses 12a and 12b is not available, denoted by the lenses being overlapped in the figure. Hence the requirement to use lenses that will collimate light propagating through the crystal 10, places a constraint on using a crystal that is sized to at least accommodate two lenses or collimated beams of light.

Figure 3A:
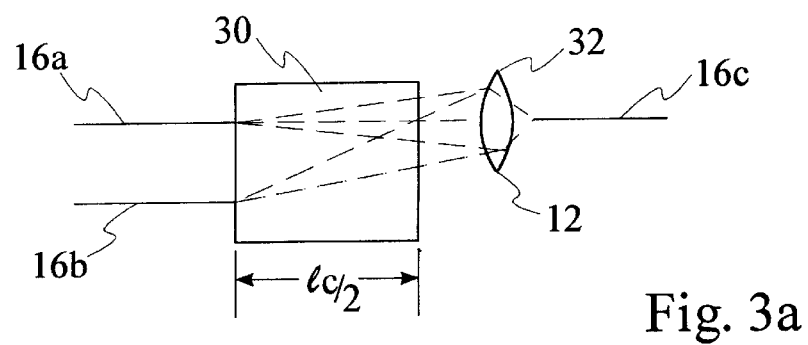
FIG. 3a is a top view of a polarization beam splitter in accordance with an embodiment of the invention wherein uncollimated light is launched through a birefringent crystal.

In accordance with a first embodiment of this invention, and referring to FIG. 3a, a polarizing beam splitter/combiner is shown having two waveguides in the form of optical fibres 16a and 16b directly coupled, using fibre tubes, not shown, to an end face of a small birefringent crystal 30. It should be particularly noted, that the size of the crystal 30 required in the embodiment of FIG. 3a is approximately $\frac{1}{50}^{th}$ the size of the crystal 10 required in the conventional beam splitter shown in FIG. 1. Hence, the cost saving of manufacturing the device of FIG. 3a is significantly less than the device of shown in FIG. 1. Yet still further, only one lens is required in the first embodiment of the invention, compared with three lenses required in the prior art device shown in FIG. 1.

In FIG. 3a, an output optical waveguide in the form of an optical fibre is disposed a distance from the end face of the crystal 30. A lens 32 is disposed between the optical fibre 16c and the crystal 30 for coupling light between the optical fibres 16a and 16c and between the optical fibres 16b and 16c.

In this embodiment since the optical fibres 16a and 16b can be very close to one another, the size of the crystal 30 can be made very small, resulting in considerable cost savings. Furthermore it becomes practicable to propagate beams from the fibres 16a and 16b through the crystal 30 as uncollimated beams, and to couple these beams with the optical fibre 16c via a lens 32, only if the crystal is very short in length; it is apparent that the beam diameter propagating through the crystal increases as the length of the crystal increases.

In operation, the device shown in FIG. 3a works in the following manner. As a beam splitter, light of unknown polarization is launched into optical fibre 16c, which functions as an input port. As the beam traverses the crystal 30 it separates into two beams. The o-ray polarized beam is directed by the crystal port 16a and the e-ray polarized light is directed to port 16b. Conversely combining is performed in a same manner in an opposite direction. Since no lens is present between the fibres 16a, 16b and the crystal 30, light traversing the short length of the crystal is non-collimated.

Currently, in many optical devices, lenses of various types are used to collimate a diverging light beam exiting an optical waveguide and to focus light that being launched into an optical waveguide so as to more efficiently couple the light.

One of the most ubiquitous building blocks used in the design and manufacture of optical elements is the graded index (GRIN) lens. Lenses of this type are produced under the trade name "SELFOC"; the mark is registered in Japan and owned by the Nippon Sheet and Glass Co. Ltd. GRIN lenses in combination with other optical elements are used in the manufacture of WDM devices, optical couplers, circulators, isolators, and other devices. The use of a GRIN lens in this invention provides a number of advantages over other conventional lenses, however does not limit the invention to only GRIN lenses.

Advantages of GRIN lenses are that they are relatively inexpensive, compact, and furthermore have parallel flat end faces. In particular, the flat end face of the GRIN lens allows a single lens to be used as a means of collimating or focusing the light, and as well, as a means of tapping light reflected from the end face of the lens.

Referring now to FIG. 3b a substantially quarter pitch GRIN lens is shown, with traces of three beams launched from three locations, 41c, 41b, and 41a adjacent an end face of the lens 42. The beam launched from location 41c is shown to be expanding and entering the lens with a wider diameter than the other two beams launched from locations 41b and 41a. This also illustrates that when light is launched into the opposite end of the lens as a collimated beam, the focusing location(s) of the beam is dependent upon the beam diameter.

If light is to be efficiently coupled through a lens, such as a GRIN lens, it is preferred to launch a beam having a narrow diameter into the lens. Thus, in FIG. 3a, if the beam entering the lens 32 propagating toward the optical fibre 16c from one of 16a and/or 16b has a diameter that is too wide, some of the light entering the periphery of the lens will not be efficiently coupled into the receiving end of the optical fibre 16c.

FIG. 3d illustrates an alternative embodiment of the invention wherein the beam propagating from the optical fibre 16a toward 16c has a relatively small diameter, and wherein the diameter of the beam entering the lenses 42 is approximately half of the diameter of the beam entering the lens 42 in the arrangements shown in FIG. 3c or 3a.

Figure 4A:
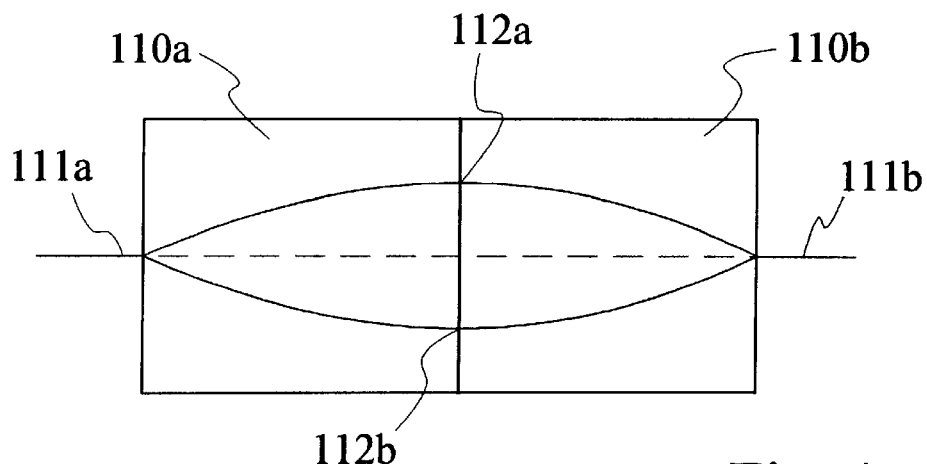
FIG. 4a is a side view of a prior art arrangement of a pair of back to back quarter pitch GRIN lenses having input/output waveguides positioned along the optical axes of the lenses.

Turning now to FIG. 4a, a pair of quarter pitch GRIN lenses 110a and 110b are shown having their collimating ends inwardly facing and their focusing ends outwardly facing. Two optical waveguides 111a and 111b are shown coaxial with and coupled to the lenses along at the optical axis of the lenses 110a and 1110b shown by a dotted line. A beam profile is also shown within the lenses 110a and 110b as if light was launched from one of the waveguides 111a and 111b to a respective lens. It should be noted that the beam profile at the interface between the two lenses extends to a circumference about the lens indicated by points 112a and 112b, being two points on the circumference.

Figure 4B:
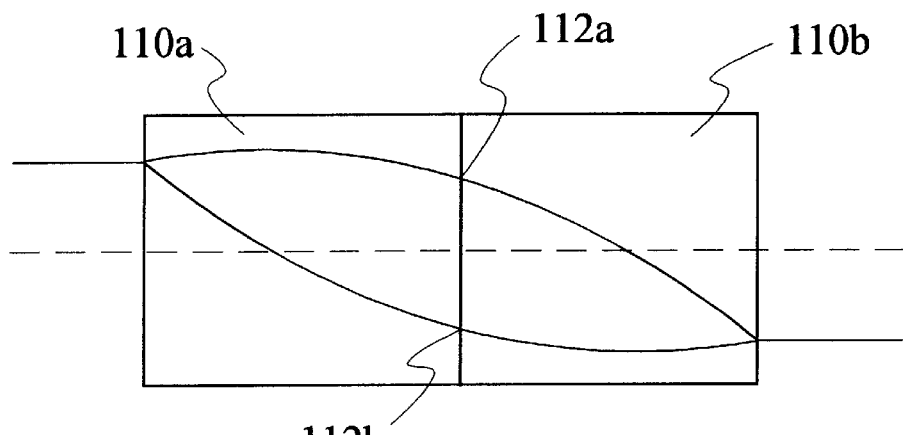
FIG. 4b is a side view of a prior art arrangement of a pair of back to back quarter pitch GRIN lenses having input/output waveguides positioned offset from the optical axes of the lenses.

FIG. 4b illustrates the same pair of GRIN lenses as in FIG. 4a, however the two optical waveguides 111a and 111b are shown to be offset a same optical distance from the common optical axis of the lenses 110a and 110b. Here, the beam profile at the interface between the two lenses extends to the same circumference as in FIG. 4a, however the angle of the beam has varied. By ensuring that there is no separation between the two lenses, and that the optical waveguides are directly coupled with respective lenses, light is most effectively coupled from one waveguide 111a into the other 111b (or vice versa) when the waveguides are parallel to the common optical axis shared by the lenses. A similar arrangement is shown in FIG. 4c, wherein input/output waveguides 1 111a and 111b are disposed on opposite sides of the optical axis of the lens, from that in FIG. 4b.

Figure 4C:
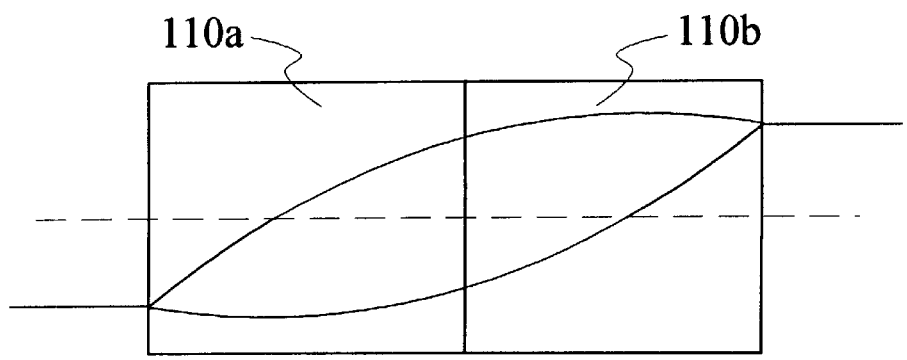
FIG. 4c is a side view of a prior art arrangement of a pair of back to back quarter pitch GRIN lenses having input/output waveguides positioned offset from the optical axes of the lenses.
Figure 4D:
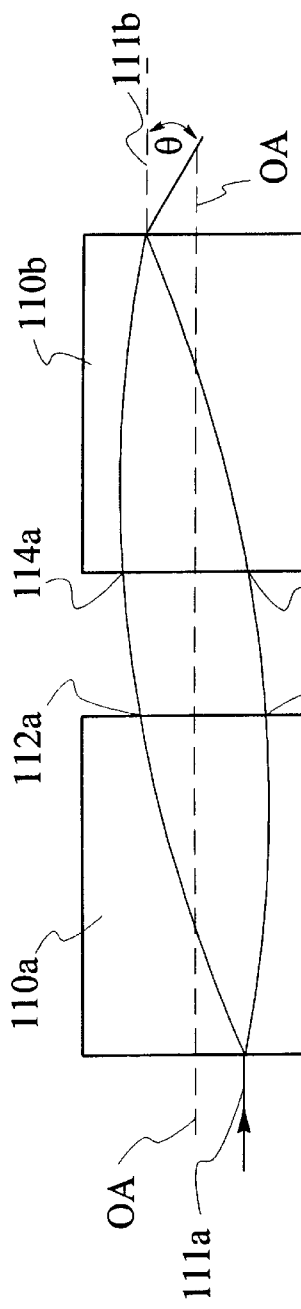
FIG. 4d is a side view of an arrangement of a pair of back to back spaced GRIN lenses having input/output waveguides positioned offset from the optical axes of the lenses.

Referring now to FIG. 4d, the lenses shown in FIG. 4c are now spaced apart a fixed distance. The optical axis of the waveguide 111 is shown to be parallel to the optical axis OA of the lens 110a. However, in order to efficiently couple light from the output waveguide 111b, it must be non-parallel to the input waveguide 111a and at an angle θ with respect to the optical axis of the lens 110b, dependent upon the amount of separation. Essentially as the separation increases between the two lenses, the output beam diverges from the optical axis of lens 110b.

Figure 4E:
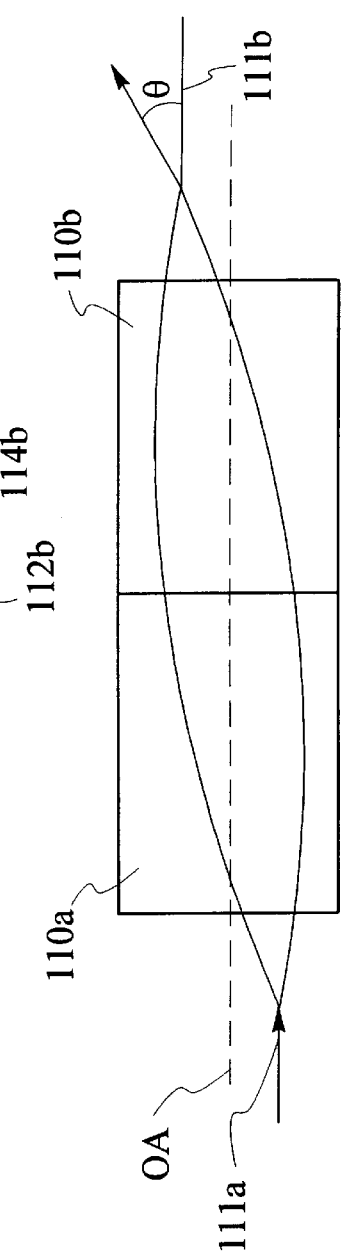
FIG. 4e is a side view of an arrangement of a pair of back to back GRIN lenses having input and output waveguides spaced from the lenses and, FIG. 4f is a side view of an arrangement of a pair of back to back spaced GRIN lenses having input/output waveguides positioned offset from the optical axes of the lenses in accordance with this invention.

In FIG. 4e the lenses 110a and 110b are shown having no gap between them, however, the input and output optical waveguides 111a and 111b are spaced from the end faces of the lenses they are optically coupled therewith. As a result of this gap, the light coupling into the optical fibre 111b is at an angle θ and light does not couple efficiently into the waveguide.

Figure 4F:
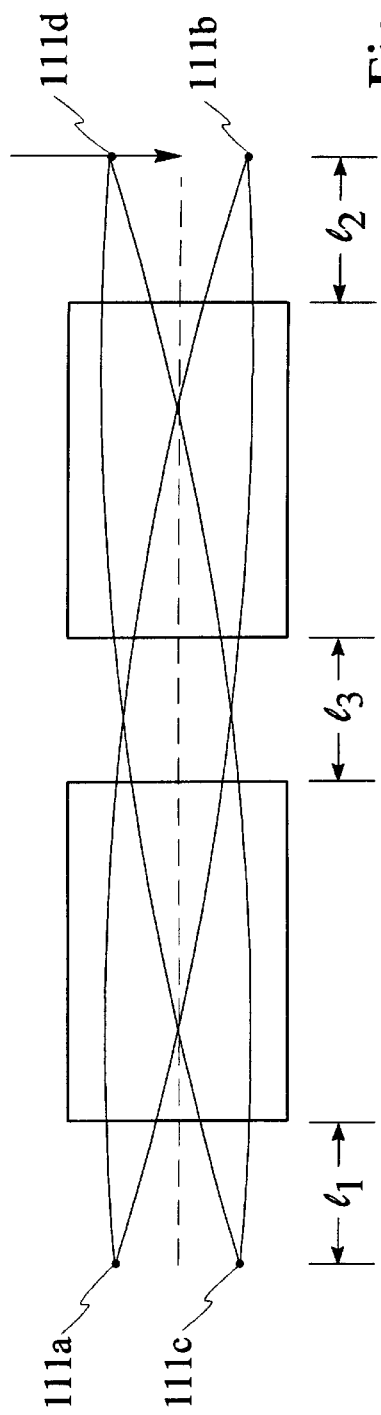

In accordance with this invention, and as is shown in FIG. 4f, light can efficiently be coupled from an input waveguide to an output waveguide that are both substantially parallel with an optical axis of one of the lenses 110a or 110b by ensuring that the spacing of the input waveguides and the spacing between adjacent lenses is within a predetermined ratio. More particularly, the lenses 110a and 110b shown in FIG. 4f are spaced an optical distance $l_3$. The input waveguides 111a and 111c are an optical distance $l_1$ from the end face of the lens 110a. The output waveguides 111b and 111d are an optical distance $l_2$ from their adjacent lens 110b.

For optimum coupling to exist, and for the input and optical waveguides to have their optical axes parallel with the optical axis of the coaxial lenses, the following relationship should exist: $l_1 \approx l_2 \approx 0.5\, l_3$.

Referring once again to FIG. 3d, in accordance with a second embodiment of the invention, two identical birefringent crystals 50a and 50b are shown wherein each is half the length of the crystal 30 in a first embodiment of the invention. Disposed between the crystals 50a and 50b are two substantially focusing lenses having their focus location a distance from their end faces, midway between the lenses 42. Waveguides 16a and 16b are coupled to an end of one of the crystals 50a and waveguide 16c is coupled to the crystal 50b.

In operation, o-ray oriented light launched into port 16a is directed to port 16c across the device as in the previous embodiments and e-ray oriented light launched into port 16b is directed to port 16c for combining with the o-ray oriented light. However, since the crystal 42 is shorter than the crystal 30, the beam entering the lens 42 adjacent 50a is much smaller and a preferred portion of the lens 50a is used. Similarly the region about the periphery of the lens 50b is unused and optimum coupling is achieved from the port at 16a to 16c, and 16b to 16c. Here to achieve optimum coupling, $d_1$ the distance from the ports to the nearest lens is twice the distance $2d_1$ between the two lenses.

Although in the exemplary embodiments shown, the lenses are illustrated as having end faces that are orthogonal to the lens axis, in practice, the lens may be polished and slanted to reduce the affect of unwanted back reflections.

In summary, the advantages of the structure according to this invention are numerous. Smaller and fewer components are required and hence the device is considerably less expensive to manufacture. Furthermore, the device can be smaller than prior art devices that perform a polarization combining or splitting function.

Of course, numerous other embodiments may be envisaged, without departing from the spirit and scope of the invention.

What is claimed is:

1. A polarization beam splitter/combiner comprising:
    a first optical waveguide;
    two closely spaced optical waveguides disposed a predetermined distance from the first optical waveguide and optically coupled therewith;
    a birefringent crystal disposed between the first optical waveguide and the two closely spaced optical waveguides such that the first optical waveguide and the two closely spaced optical waveguides are on opposite sides of the birefringent crystal, said crystal for splitting an uncollimated input beam into a first beam of a first polarization and a second beam of a second orthogonal polarization;
    lens means disposed between at least one of the optical waveguides and the birefringent crystal for directing uncollimated light through the birefringent crystal and for focusing light at an end face of at least one of the optical waveguides.

2. A polarization beam splitter/combiner comprising:
    a first optical waveguide;
    two closely spaced optical waveguides disposed a predetermined distance from the first optical waveguide and optically coupled therewith;
    a birefringent crystal disposed between the first optical waveguide and the two closely spaced optical waveguides for splitting an uncollimated input beam into a first beam of a first polarization and a second beam of a second orthogonal polarization;
    lens means disposed between at least one of the optical waveguides and the birefringent crystal for directing uncollimated light through the birefringent crystal and for focusing light at an end face of at least one of the optical waveguides, wherein the waveguides are optical fibres and wherein the lens means is disposed between the first optical fibre and the birefringent crystal for receiving combined uncollimated orthogonal polarized beams of light from the two closely spaced fibres that have propagated through the birefringent crystal and have combined within the crystal as uncollimated beams.

3. A polarization beam splitter/combiner as defined in claim 2 wherein the waveguides are optical fibres and wherein the beam splitter/combiner further comprises:

a second birefringent crystal disposed between the first optical fibre and the two closely spaced optical fibres.

4. A polarization beam splitter/combiner as defined in claim 3, wherein the lens means is comprised of two lenses, the two lenses being disposed between the two birefringent crystals.

5. A polarization beam splitter/combiner comprising:

two lenses, each lens having an at least substantially collimating end face and a substantially focusing end face;

a birefringent crystal coupled with at least one of the two lenses for separating/combining orthogonally polarized beams of light such that the two lenses are on opposite sides of said birefringent crystal;

a waveguide adjacent at least each of the two lenses for launching light to or from a respective adjacent lens, the waveguides each having an end that is separated from its adjacent lens by an optical distance of approximately $d_1$, an optical distance between the two substantially collimating end faces of the at least two lenses being d2, where $d_1$ is approximately equal to one half of $d_2$, and wherein $d_1 > 0$, and, wherein the birefringent crystal is disposed to receive uncollimated light from one of the waveguides.

* * * * *